United States Patent
Kulkarni et al.

(10) Patent No.: US 9,693,063 B2
(45) Date of Patent: Jun. 27, 2017

(54) VIDEO ANALYZER

(71) Applicant: SLING MEDIA PVT LTD, Bangalore (IN)

(72) Inventors: Sushant Sudhir Kulkarni, Bangalore (IN); Arunoday Thammineni, Bangalore (IN); Yatish J. Naik Raikar, Bangalore (IN); Varunkumar B. Tripathi, Bangalore (IN)

(73) Assignee: Sling Media PVT Ltd., Bangalore (IN)

( * ) Notice: Subject to any disclaimer, the term of this patent is extended or adjusted under 35 U.S.C. 154(b) by 0 days.

(21) Appl. No.: 14/860,300

(22) Filed: Sep. 21, 2015

(65) Prior Publication Data
US 2017/0085884 A1   Mar. 23, 2017

(51) Int. Cl.
| H04N 19/54 | (2014.01) |
| H04N 17/04 | (2006.01) |
| H04N 19/176 | (2014.01) |
| H04N 19/14 | (2014.01) |
| H04N 19/86 | (2014.01) |
| H04N 19/154 | (2014.01) |

(52) U.S. Cl.
CPC .......... *H04N 19/154* (2014.11); *H04N 17/04* (2013.01); *H04N 19/14* (2014.11); *H04N 19/176* (2014.11); *H04N 19/86* (2014.11); *G06T 2207/20021* (2013.01); *G06T 2207/30168* (2013.01)

(58) Field of Classification Search
CPC ...... H04N 17/04; H04N 19/86; H04N 19/154; H04N 19/176; H04N 19/14
See application file for complete search history.

(56) References Cited

U.S. PATENT DOCUMENTS

| 5,796,875 | A | * | 8/1998 | Read | G06T 5/20 382/261 |
| 6,026,232 | A | * | 2/2000 | Yogeshwar | G11B 27/034 358/537 |
| 6,167,155 | A | | 12/2000 | Kostrzewski et al. | |
| 6,285,801 | B1 | * | 9/2001 | Mancuso | G06T 5/002 348/445 |
| 6,535,717 | B1 | * | 3/2003 | Matsushima | H04H 20/16 370/316 |
| 7,733,372 | B2 | * | 6/2010 | Ong | H04N 17/004 348/180 |
| 8,244,061 | B1 | * | 8/2012 | Carson | H04N 5/21 348/251 |
| 8,514,928 | B2 | * | 8/2013 | Clark | H04L 43/0829 375/240 |

(Continued)

OTHER PUBLICATIONS

USPTO, Final Office Action in U.S. Appl. No. 14/860,313 mailed Oct. 24, 2016.

*Primary Examiner* — Brian Yenke
(74) *Attorney, Agent, or Firm* — LK Global

(57) ABSTRACT

A content receiver and a method for controlling the same are provided. The content receiver, for example, may include, but is not limited to, a communication system configured to receive video content comprising a plurality of video frames from a content source, and a video analyzer configured to determine when compression of the video content is causing blockiness in one or more of the plurality of video frames, and trigger at least one content receiver response when the compression of the video content is causing blockiness in one or more of the plurality of video frames.

7 Claims, 6 Drawing Sheets

(56) References Cited

U.S. PATENT DOCUMENTS

| | | |
|---|---|---|
| 9,131,213 B2* | 9/2015 | Wei ............... H04N 17/004 |
| 2001/0028743 A1 | 10/2001 | Kostrzewski et al. |
| 2002/0164084 A1* | 11/2002 | Baggs ............... G06T 5/20 |
| | | 382/275 |
| 2006/0182183 A1* | 8/2006 | Winger ............. H04N 19/61 |
| | | 375/240.27 |
| 2007/0047658 A1* | 3/2007 | Tourapis ............ H04N 5/21 |
| | | 375/240.25 |
| 2007/0140134 A1* | 6/2007 | Clark ............... H04B 17/00 |
| | | 370/244 |
| 2008/0215704 A1* | 9/2008 | Curcio ........... H04L 12/5695 |
| | | 709/217 |
| 2008/0266398 A1* | 10/2008 | Ferguson .......... H04N 19/61 |
| | | 348/181 |
| 2009/0063561 A1* | 3/2009 | Sayko ......... G06F 17/30038 |
| 2009/0073006 A1* | 3/2009 | Wegener ............ G10L 19/24 |
| | | 341/61 |
| 2009/0148062 A1* | 6/2009 | Gabso ............. G06T 7/0085 |
| | | 382/266 |
| 2009/0153734 A1* | 6/2009 | Glen ............... G09G 5/006 |
| | | 348/552 |
| 2009/0208140 A1* | 8/2009 | Jayant ............. G06T 7/0004 |
| | | 382/309 |
| 2009/0244289 A1* | 10/2009 | Raake ............ H04L 41/5038 |
| | | 348/180 |
| 2009/0315996 A1 | 12/2009 | Guler et al. |
| 2010/0014596 A1* | 1/2010 | Bruton ............. G06T 5/002 |
| | | 375/240.27 |
| 2010/0053351 A1* | 3/2010 | Lukac ............... H04N 9/045 |
| | | 348/222.1 |
| 2010/0265334 A1* | 10/2010 | Bhaskaran ........ G06T 7/0002 |
| | | 348/180 |
| 2011/0030025 A1* | 2/2011 | Bertonis ....... H04N 21/43637 |
| | | 725/118 |
| 2011/0110650 A1* | 5/2011 | Xie ................... H04N 5/57 |
| | | 386/353 |
| 2011/0222786 A1* | 9/2011 | Carmel ............ H04N 19/176 |
| | | 382/224 |
| 2012/0163442 A1* | 6/2012 | Corona ............ H04N 17/004 |
| | | 375/228 |
| 2013/0094572 A1* | 4/2013 | Van der Auwera |
| | | ................. H04N 19/00096 |
| | | 375/240.03 |
| 2013/0202150 A1 | 8/2013 | Sinha et al. |
| 2013/0272425 A1* | 10/2013 | Van Der Auwera |
| | | ................. H04N 19/0089 |
| | | 375/240.24 |
| 2013/0297743 A1* | 11/2013 | Eschet ............... H04L 65/60 |
| | | 709/219 |
| 2014/0177734 A1* | 6/2014 | Carmel ......... H04N 19/00903 |
| | | 375/240.26 |
| 2014/0219364 A1* | 8/2014 | Gu ............... H04N 19/00909 |
| | | 375/240.26 |
| 2014/0254688 A1 | 9/2014 | Tian et al. |
| 2014/0365889 A1* | 12/2014 | Lipman ............ H04L 65/403 |
| | | 715/719 |
| 2015/0146012 A1* | 5/2015 | Shipley ............. H04L 65/80 |
| | | 348/177 |
| 2015/0264406 A1* | 9/2015 | Kim ................. H04N 19/80 |
| | | 375/240.29 |
| 2015/0334386 A1 | 11/2015 | Brice et al. |
| 2015/0350747 A1 | 12/2015 | Jackson et al. |
| 2016/0021376 A1* | 1/2016 | Andreopoulos ..... H04N 17/004 |
| | | 348/181 |

* cited by examiner

200

210

220

300

310

320

VIDEO ANALYZER

TECHNICAL FIELD

The following relates to content receives, and more particularly, to systems and methods for measuring the quality of video being received by content receivers.

BACKGROUND

Video is a popular form of entertainment as well as a source for news, education and a variety of other programming. Video content may be viewed on televisions, computers, cellular phones, tablets and a wide variety of other devices. The video content may be broadcast over a cable connection, broadcast over a satellite connection, received by devices over a wired internet network or received over a wide variety of wired internet based connections.

The quality of the video content can be affected in a variety of ways. Satellite broadcast television can be interrupted by weather causing packet loss. Likewise, network congestion can cause packet loss. Packet loss can cause part or all of one or more video frames of the video content to be lost, reducing a quality of viewing experience by a user. Furthermore, when bandwidth of a connection is slow, a content source may be forced to compress video content to lower the bit-rate of the content such that the video plays smoothly (i.e., without constantly stopping to buffer). The compression can cause blockiness in the video content, reducing a quality of viewing experience by a user

SUMMARY

In one embodiment, for example, a content receiver is provide. The content receiver may include, but is not limited to, a communication system configured to receive video content comprising a plurality of video frames from a content source, and a video analyzer configured to determine when compression of the video content is causing blockiness in one or more of the plurality of video frames, and trigger at least one content receiver response when the compression of the video content is causing blockiness in one or more of the plurality of video frames.

In another embodiment, for example, a method for analyzing one or more video frames of video content is provided. The method may include, but is not limited to, receiving, by a video analyzer of a content receiver, the one or more video frames from a content source, determining, by the video analyzer of the content receiver, when compression of the video content by the content source is causing the one or more video frames to be blocky, and triggering, by the video analyzer of the content receiver, a content receiver response when the one or more video frames is determined to be blocky.

DESCRIPTION OF THE DRAWING FIGURES

Exemplary embodiments will hereinafter be described in conjunction with the following drawing figures, wherein like numerals denote like elements.

FIG. 1 is a block diagram of a video analyzer system in accordance with an embodiment; and FIGS. 2 and 3 illustrate frames of video to illustrate artifact insertion;

FIG. 4 a flow diagram illustrating an exemplary method for quantifying an effect of artifacts in video frames, in accordance with an embodiment;

DETAILED DESCRIPTION

According to various exemplary embodiments, a content receiver having a video analyzer is provided. The video analyzer can detect when artifacts or compression is affecting a quality of the video being viewed by a user. As discussed in further detail below, the video analyzer quantifies an effect of artifacts or compression on the video frame(s), taking into account user perceptibility, to effectively measure a user's viewing experience.

Figure 1:
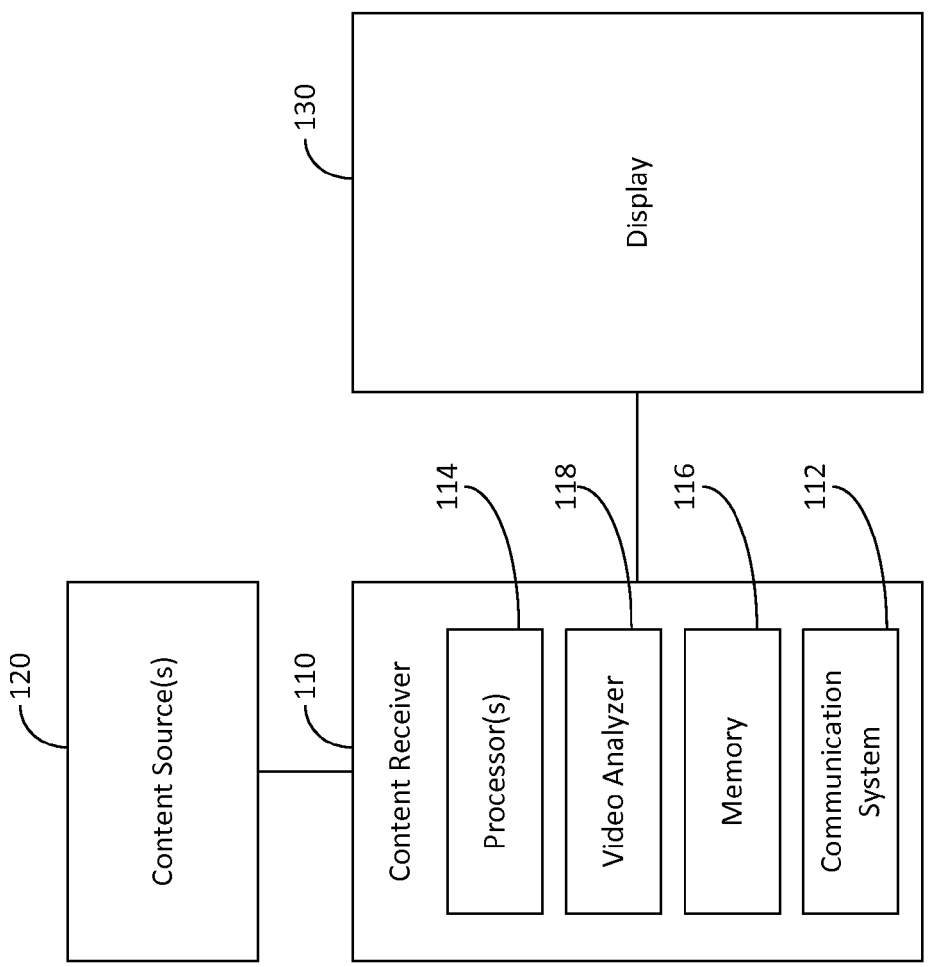

FIG. 1 is a block diagram of a video analyzer system 100 in accordance with an embodiment. The video analyzer system 100 includes a content receiver 110. The content receiver 110 may be, for example, a set-top box, a digital video recorder, a television, a place-shifting device, a cellular phone, a tablet, a laptop computer, a desktop computer, or any other device capable of receiving or displaying media. The content receiver 110 receives video content from a content source 120 via a communication system 112. The content source may be a broadcast content source, such as a cable, satellite or the like, or a network (e.g., internet) based content source. The communication system 112 may vary depending upon the content source 120. The communication system 112, for example, may be a satellite data receiver, a cable-television interface, a network interface, a wireless communication system (e.g., WiFi, cellular, Bluetooth, Zigbee, etc.), or any combination thereof.

The content receiver 110 further includes at least one processor 114. The processor 114 receives the video content from the communication system 112 and outputs user selected video content to a display 130, saves selected content in a memory 116 when the content receiver 110 includes a digital video recording system or shifts (i.e., retransmits) the content to another content receiver 110.

However, in certain situations, some of the video content may not have been received by the content receiver 110. Weather, network congestion or a variety of other factors can cause part of the video data to be lost, otherwise known as packet loss. The processor 114, in instances where packet loss has occurred, may insert artifacts into one or more video frames of the selected content.

Figure 2:
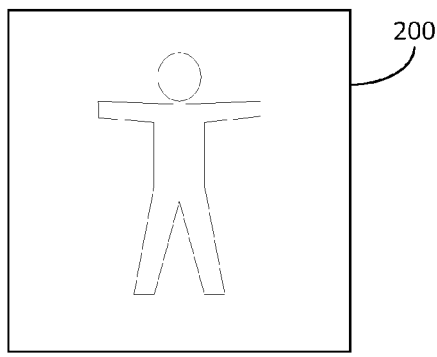
Figure 2:
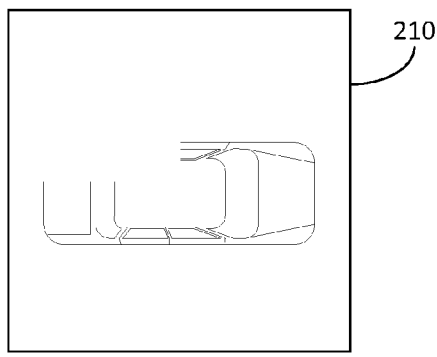
Figure 2:
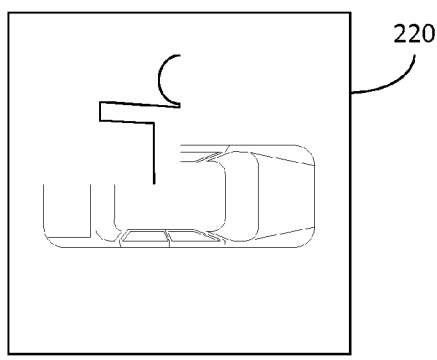
Figure 3:
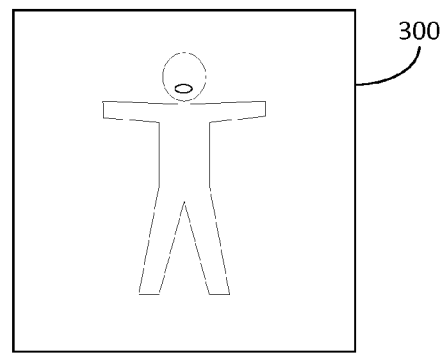
Figure 3:
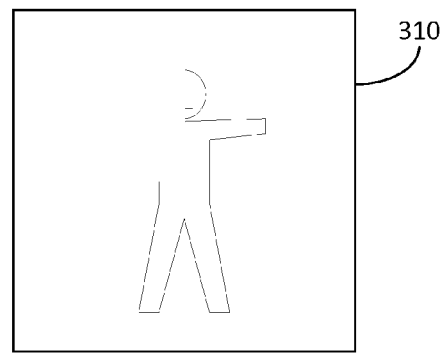
Figure 3:
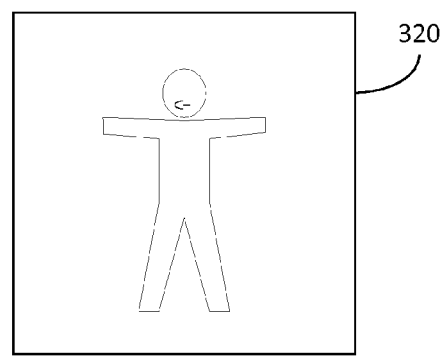

FIGS. 2 and 3 illustrate frames of video to illustrate artifact insertion. Frame 200 is a first frame received at a first time and is a complete frame. Frame 210 is a second frame subsequent to frame 200. As seen in FIG. 2, frame 210 is missing a portion of data. Accordingly, in some embodiments, the content receiver 110 may insert a portion of a previously received frame (i.e., frame 200) and present the combined frame 220 subsequent to frame 200, resulting in a garbled image combining a vehicle and a person. In other words, the resulting frame combining data from frames 200 and 210 results in a highly noticeable mismatch that would degrade a user's viewing experience. In another example, frame 300 is a first frame received at a first time and is a complete frame. Frame 310 is a second frame subsequent to frame 300. As seen in FIG. 3, frame 310 is also missing a portion of data. However, in this example, the differences between frame 300 and 310 are small, merely a change in the persons lip position. Accordingly, when the content receiver 110 adds the data from frame 300 to frame 310, the resulting frame 320, while minimally mismatched, would not significantly reduce a user's viewing experience.

Accordingly, the insertion of artifacts into one or more video frames can effectively mask packet loss depending upon the content being displayed. Fast moving images, such as sporting events or action movies, may be affected by artifact insertion more than slower moving images, such as news reports or situational comedy programs. However, a category (i.e., sports, news, etc.) is not dispositive as there can be slowly changing video frames during typically fast changing programs and fast changing frames during typically slower programming. As discussed in further detail below, the content receiver 110 may analyze one or more frames to quantify an effect of the artifact insertion into the frames. The content receiver 110, based upon the quantification, can determine whether a user's viewing experience would have been affected by the artifact insertion.

While FIGS. 2 and 3 illustrated data from previous frames being inserted into a frame experiencing packet loss, some content receivers 110 may alternatively input default data into a frame experiencing packet loss. The default data it typically a color patch, the color patch being a block of video data of a predetermined color, often green or pink. A color patch may be introduced when the content receiver 110 does not have any error concealment mechanism and the default frame color (which could be, for example, grey, green, pink or any other desired default color) is retained. As with artifact insertion using old data, artifact insertion using default data may effectively mask data loss in certain situations, depending upon what is on the screen at the time. As discussed in further detail below, the content receiver 110 may also quantify an effect of default data type artifact insertion to determine if a user's viewing experience would be affected by the artifact insertion.

Returning to FIG. 1, the content receiver 110 may receive video content at a variety of bitrates from content source(s) 120. Certain channels of a broadcast television source, for example, may be streamed in low definition, high definition, ultra-high definition or the like. Network based content sources 120 may output video content at a wide variety of bitrates depending upon available bandwidth. When bandwidth is low, the content source 120 (broadcast or network based) may transmit the video content at a lower bit rate (e.g., standard definition video quality or less) when the content source 120 would normally transmit higher quality media (e.g., high definition, 4K, etc.), when the bandwidth limitation was not present. However, the presence of lower quality video may not necessarily affect the quality of the video perceived by the user in a similar way as packet loss may not affect video quality. In other words, a user's viewing experience may not necessarily be significantly affected when low bit-rate video content is being displayed. As discussed in further detail below, the content receiver 110 may quantify an effect of the compressed video on a user's viewing experience.

In order to quantify an effect of the artifact insertion or the video compression, the content receiver 110 further includes a video analyzer 118. The video analyzer 118 analyzes the quality of the video being displayed on the display as perceived by the user. In one embodiment, for example, the video analyzer 118 may be a processor such as a central processing unit (CPU), an application specific integrated circuit (ASIC), a field programmable gate array (FPGA), a graphical processing unit (GPU), a microprocessor, or any other logic device or combination thereof. In one embodiment, for example, the video analyzer 118 may be a separate logic unit from the processor 114 of the content receiver 110. However, in other embodiments, the processor 114 may perform some or all of the functions of the video analyzer 118.

As noted above, the content receiver 110 may include a memory 116. The memory may store non-transitory computer-readable instructions which, when executed by the video analyzer 118, evaluate a quality of the video being displayed on the display, saved in the memory 116, or retransmitted to another content receiver 110, as discussed in further detail below.

Figure 4:
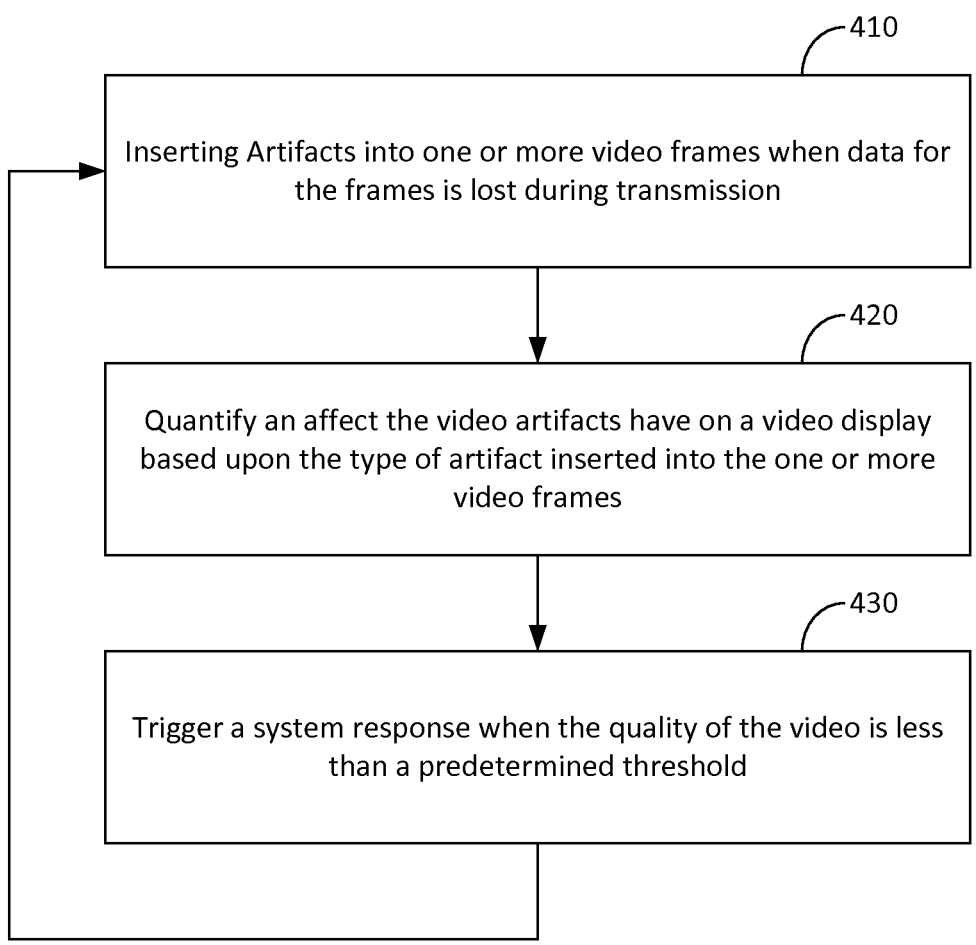

FIG. 4 a flow diagram illustrating an exemplary method 400 for quantifying an effect of artifacts in video frames, in accordance with an embodiment. The method begins when the processor 114 inserts artifacts into one or more video frames when data for the video frames is lost during transmission. (Step 410). As discussed above, the processor may insert data from previous frames, default data, or a combination thereof into a current frame. The video analyzer 118 then quantifies an affect the video artifacts have on the video frame based upon the type of artifact inserted into the one or more video frames. (Step 420). As discussed in further detail below, the video analyzer 118 determines a number of edges in the one or more video frames due to the inserted artifacts which are perceptible to a viewer. As discussed above, some artifact insertions may be less perceptible to a user. Accordingly, by determining which edges of the inserted artifacts are more perceptible to a user, the video analyzer can better quantify the effect of the artifact insertion into the video frame. The video analyzer 118 then determines that a quality of the video content is less than a predetermined threshold when the determined number of edges exceeds a predetermined threshold.

When the quality of the video content is below a predetermined threshold, the video analyzer 118 triggers a content receiver response. (Step 430). The content receiver response can vary depending upon the needs of the system. In one embodiment, for example, the content receiver response may be to transmit health of a channel data with respect to packet loss to a monitoring system via the communication system 112. In other embodiments, for example, the video analyzer 118 may send a request to the content source 120 through the communication system 112 to retransmit the missing data (i.e., either the missing packets or the entire video content). In yet other embodiments, the content receive response may be to trigger better error correction mechanisms at the content source 120 to help the processor 114 deal with the errors in a better way. For example, the content source can add redundancy to the data (e.g. FEC) being transmitted to receiver, the data packets. In yet other embodiments, the content receiver response may be to use alternate channels for establishing better connections to get the least packet loss channel to be established. For example, if the content receiver is experiencing packet loss affecting the video content over a broadcast television source, the content receiver may attempt to locate the video content via a network based source. In yet other embodiments, for example, the content receiver response may be to schedule a new recording of the video content so that a good quality copy of the video content is available to be watched later by a user of the content receiver 110. Any combination of the content system responses may be used by the content receiver 110 in response to the video analyzer 118 detecting low quality video content.

Figure 5:
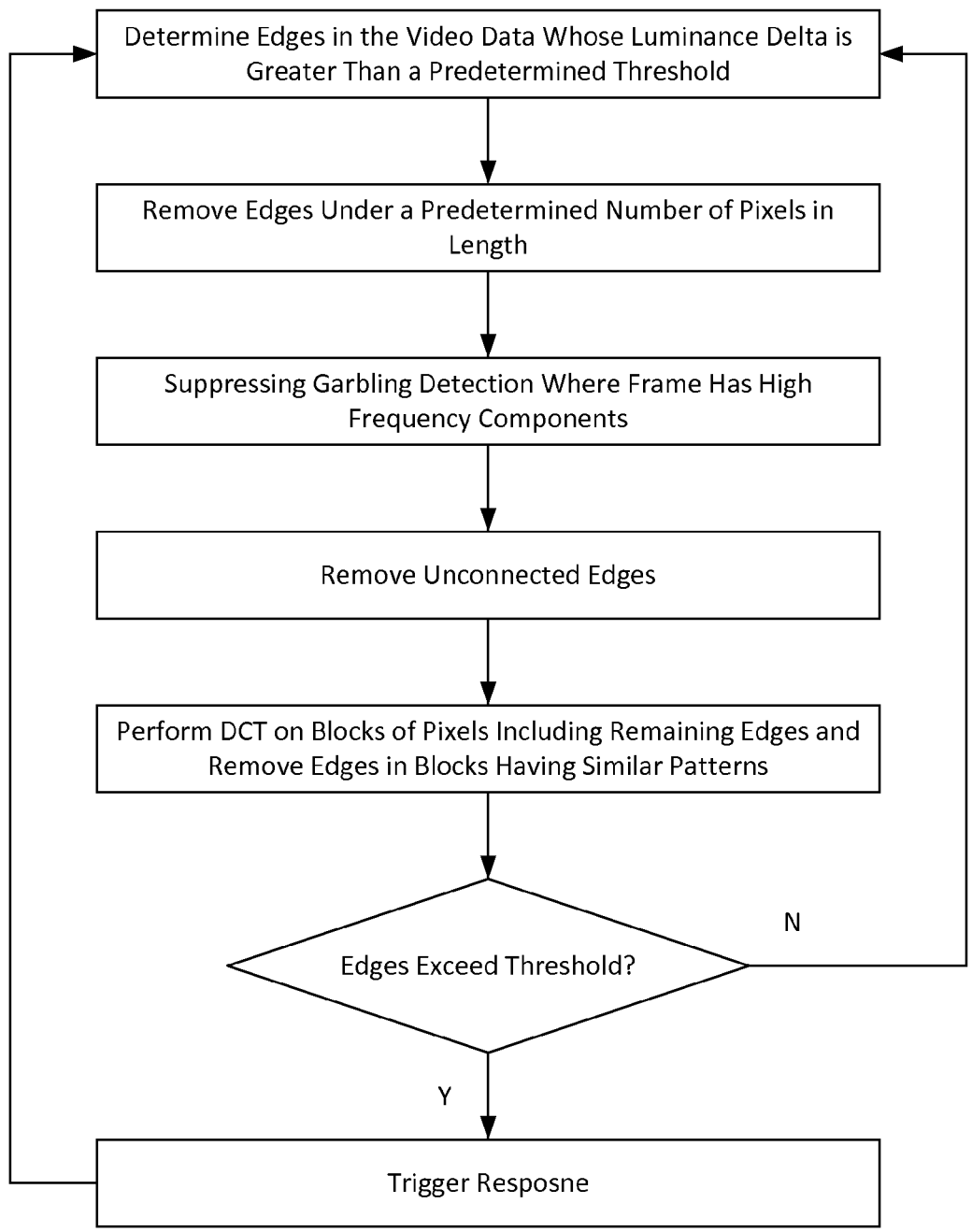
FIG. 5 is a flow diagram illustrating an exemplary method for quantifying an effect of artifacts in video frames, in accordance with an embodiment.

FIG. 5 is a flow diagram illustrating an exemplary method 500 for quantifying an effect of artifacts in video frames, in accordance with an embodiment. As discussed above, a content receiver 110 may attempt to mask packet loss by inserting data from previous video frames into a current video frame, otherwise known as artifact insertion. However, the quality of the video as perceived by the user may not be significantly affected by this process. Accordingly, the method 500 detects the success of the content receiver 110 in masking the packet loss in real time by quantifying the effects of the artifact insertion into a video frame.

The video analyzer 118 may first determine all of the edges in a video frame whose luminance delta next to subsequent edges is greater than a predetermined threshold. (Step 510). The video analyzer 118 may analyze the entire video frame or just in areas where the content receiver 110 has inserted artifacts into the video frame. Edges whose luminance delta exceeds the predetermined threshold may be a result of artifact insertion (i.e., insertion of old data) into a video frame which would significantly affect the quality of video being watched by the user. The edges are lines of pixels in either a vertical or horizontal direction. In one embodiment, for example, the minimum length in order for an edge to be considered for analysis may be 3 pixels. However, the length of an edge may be any number of pixels depending upon a desired sensitivity. The video analyzer 118 compares the luminance of the pixels in each edge to the luminance of pixels next to the respective edge. If the difference of the luminance is greater than a predetermined threshold, the video analyzer 118 flags the edge as possible including garbled data and includes the edge in subsequent video quality analysis, as discussed in further detail below. In one embodiment, for example, the threshold may be 15 (the minimum difference between adjacent pixels where an edge gets perceived to be garbled, however, the threshold can vary depending upon a desired sensitivity and the overall intensity of the frame (bright/dark). As discussed in further detail below, if the number of edges whose luminance delta next to subsequent edges is greater than a predetermined threshold, the user's quality of experience may suffer. However, video frames having edges whose luminance delta exceeds the predetermined threshold can occur in any video frame. Accordingly, the video analyzer further processes the edges identified in Step 510 to reduce false positives.

The video analyzer 118 removes edges under a predetermined number of pixels in length from the edges determined in Step 510. (Step 520). The predetermined length may be, for example, 2 pixels for a SD resolution as user is unable to perceive this as an artifact and sees this more as an high frequency component which is part of the video, however, the predetermined number of pixels can vary depending upon a desired sensitivity. Edges under the predetermined length may be indicative of detailed features, such as hair or grass, or may otherwise be difficult for a user to perceive, thus not affecting a user's quality of experience.

The video analyzer 118 may then suppress garbling detection where the video frame has high frequency components by removing edges forming pluses or crosses from the edges determined in Step 510 and removing edges forming small squares or other quadrilaterals from the edges identified in Step 510. (Step 530). Edges which cross other identified edges to form pluses or crosses (depending upon the length of each edge), may be more difficult for a user to perceive at the frame rate of the video. In other words, edges forming pluses or crosses stand out to a user less than a single abrupt edge. As such, edges forming pluses or crosses tend to not degrade a user's experience significantly. In one embodiment, for example, if a length of a side of a square or other quadrilateral is under three pixels in length, the video analyzer may remove the respective edges from the edges identified in Step 510. However, the length of the side of the square or other quadrilateral could vary depending upon a desired sensitivity. Small squares may be indicative of a pattern such as netting or may otherwise be more difficult for a user to perceive at the frame rate of the video.

The video analyzer 118 may then remove unconnected edges from the edges identified in Step 510. (Step 540). As digital video sources transmit data in packets, a loss packet will result in a block of data being missed. The block of data generally has two dimensions. Accordingly, if an edge is unconnected the video analyzer 118 can assume that the edge is not a result of a video artifact and can remove the edge from edges identified in Step 510. Alternatively, if an unconnected edge in the video is a result of a video artifact, at least two of the four sides of the video artifact match up with the subsequent frame, and, thus would not significantly alter the user's viewing experience.

The video analyzer 118 then may perform a discrete cosine transform (DCT) on blocks of pixels in a video frame which include edges remaining from the edges identified in Step 510 after edges were removed in Steps 520-540. (Step 550). The DCT expresses the block of pixels in terms of a sum of cosine functions oscillating at different frequencies. The respective DCT's of the each of the blocks of pixels can be compared to one another. When the DCT's are similar or identical the blocks of pixels are likely a part of a repeating pattern, such as windows on a building, a checkerboard, mesh, wallpaper, flooring, brick, or any other natural, man-made or animated pattern having vertical and/or horizontal edges. In one embodiment, for example, the DC value is used to perform the comparison. When the difference in DC value is found to be greater than 50 then the block of pixels is determined as being garbling, else the block of pixels is treated as a false positive and ignored i.e. ABS (DCT[0]_BLK_1-DCT[0] BLK_2)<50. As such, edges contained in blocks having similar or identical patterns can be removed from the edges identified in Step 510.

The video analyzer 118 than determines how many edges remain from the edges identified in Step 510 after edges were removed in Steps 520-550 and compares the number of edges to a predetermined threshold. (Step 560). In one embodiment, for example, the predetermined threshold may be 190 for SD resolution. However, the predetermined threshold could vary depending upon a desired sensitivity. If the number of edges are below the predetermined threshold, the video analyzer 118 determines that the user's viewing experience has not be significantly diminished by the artifacts inserted by the content receiver 110. The video analyzer 118 thereafter returns to step 510 to analyze the next video frame.

When the number of edges exceeds the predetermined threshold, indicating low quality video content, the video analyzer triggers a response. (Step 570). Any combination of the content system responses discussed above could be triggered in response to detecting low quality video. For example, 190 unique edges detected for SD would trigger a response to detecting low quality, as this is a real time system the detection is done at a unit of 1 second to enable the source to take corrective action on the fly. The video analyzer 118 thereafter returns to step 510 to analyze the next video frame.

Figure 6:
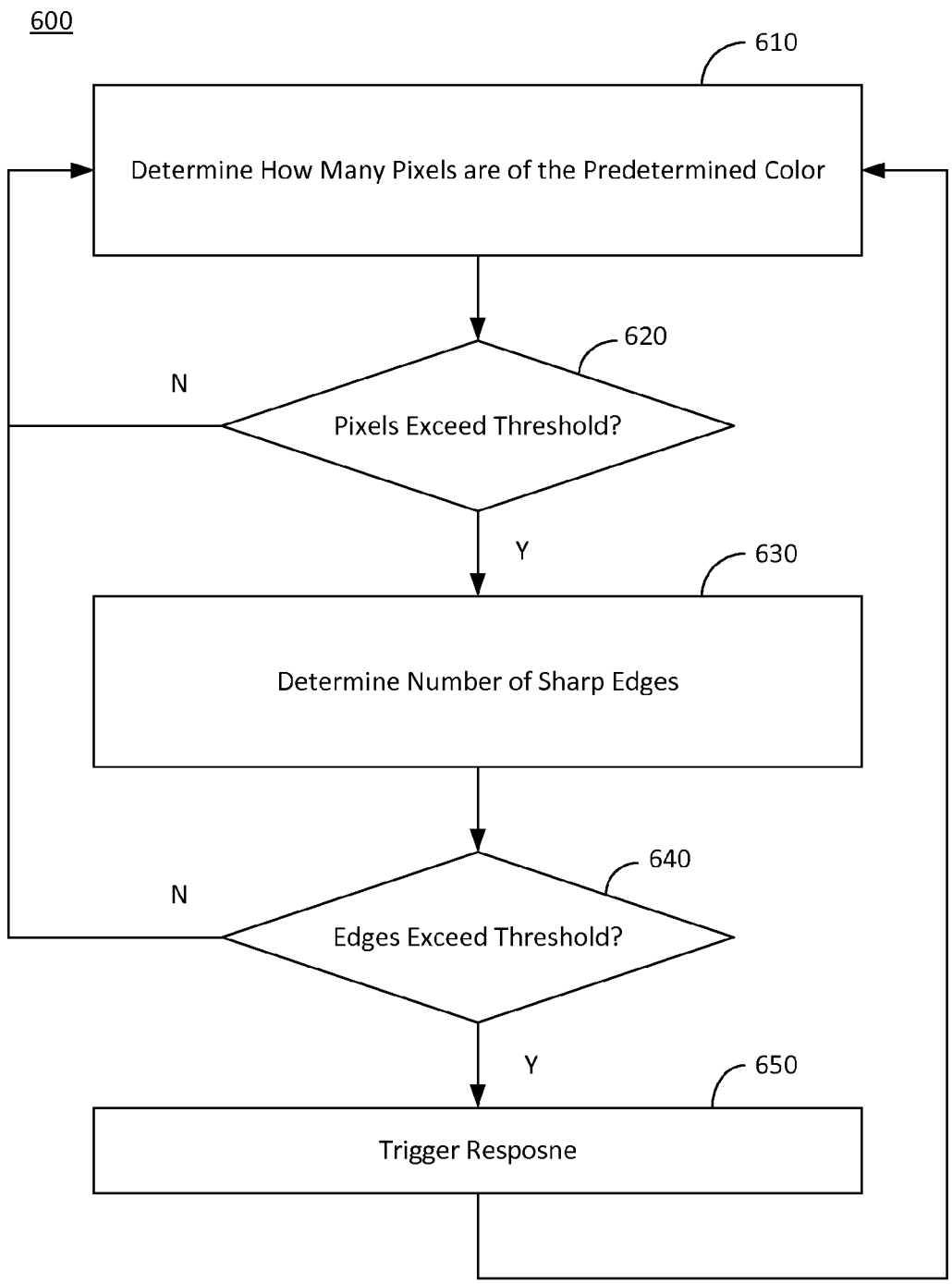
FIG. 6 is a flow diagram illustrating an exemplary method or artifact detection, in accordance with an embodiment.

FIG. 6 is a flow diagram illustrating an exemplary method 600 for artifact detection, in accordance with an embodiment. As discussed above, some content receivers 110, when encountering packet loss, may insert default data into a video frame rather than data from previous frames. The insertion of data from previous frame or default color depends on the error concealment mechanism present in the box which varies across the products. The default data is typically a solid block of color having a predetermined value, typically green or pink, though the content receiver could insert pixels of any color. In these instances, the video analyzer 118 determines whether the artifact insertion is significantly affecting a viewing experience by analyzing the colors of a video frame.

The video analyzer 118 first determines how many pixels in a video frame are of the predetermined color relative to other colors of pixels. (Step 610). In one embodiment, for example, the video analyzer may generate a histogram of pixel colors for the video frame to determine the number of pixels of the video frame of the predetermined color relative to other colors of pixels. However, the video analyzer may determine the percentage of the pixel of the predetermined color in any manner.

The video analyzer 118 then compares either the determined number of pixels against a predetermined threshold or the determined percentage of the pixels against a threshold. (Step 620). In one embodiment, for example, the threshold may be 0.1% of the total pixels in the frame, however, the threshold can vary depending upon a desired sensitivity.

When either the determined number of pixels or the determined percentage of the pixels exceeds the threshold, the video analyzer 118 then determines how many sharp edges exist in the video frame. (Step 630). A sharp edge may be determined if a pixel color next to a pixel of the predetermined color differs by more than a predetermined threshold. In one embodiment, for example, a color of a pixel may be based upon a RGB (Red, Green Blue) scale, where each pixel has a red value, a green value and a blue value. However, any color scale and scheme could be used to represent the color of the pixel. A RGB of, for example, (0, 255, 0) may be the value of the predefined color, however, the predefined color could vary. A sharp edge may be defined as any pixel having a color value a predetermined number of shades away from the predetermined color. In the video domain the colors are represented in YUV format, Y being Luminance; U and V being the chrominance component The video analyzer 118 then determines if the number of sharp edges exceeds a predetermined threshold. (Step 640). In one embodiment, for example, the threshold may be 0.3% of the pixel count of the frame, however, the threshold may vary depending upon a desired sensitivity. When the threshold is exceeded, the video analyzer 118 determines that the video content is of low quality and triggers one or more of the content system responses discussed above. (Step 650). When the threshold is not exceeded, the video analyzer 118 assumes that the artifact insertion was successful. In other words, the video analyzer determines that the artifacts inserted by the processor 114 are either not perceptible to the user or did not significantly affect the user's viewing experience.

Figure 7:
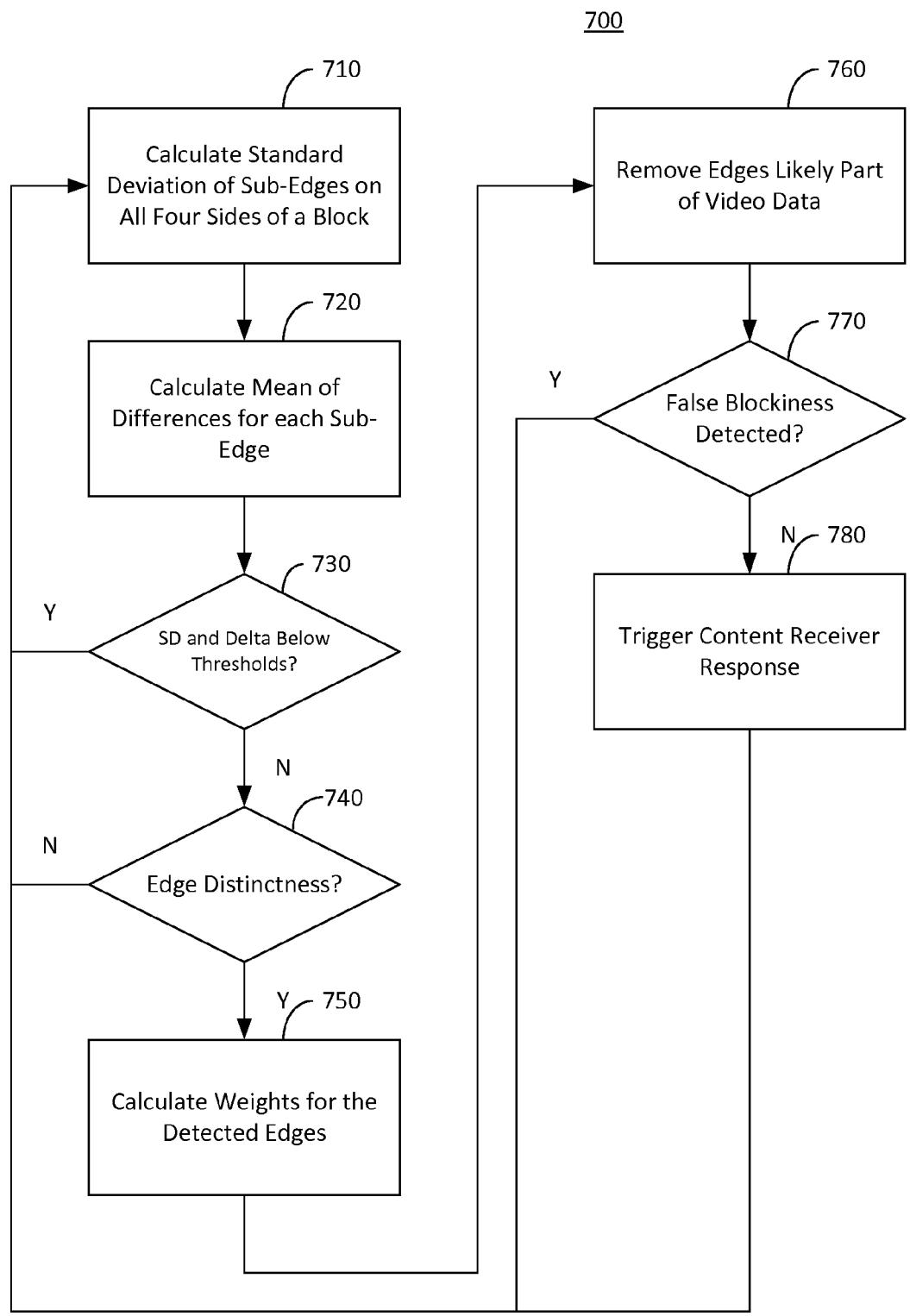
FIG. 7. is a flow diagram illustrating an exemplary method for quantifying an effect of compression artifacts in a video frame, in accordance with an embodiment.

As noted above, the video analyzer 118 may also quantify an effect of compression on the quality of video content. FIG. 7 is a flow diagram illustrating an exemplary method 700 for quantifying an effect of compression artifacts in a video frame, in accordance with an embodiment. As discussed above, compression is used when a media source 120 encodes a video to meet bandwidth limitations and may affect the quality of the video. Accordingly, the video analyzer 118 quantifies the effects of compression on a video frame and determines if the compression is affecting the quality of video seen by the user.

The video analyzer 118 first calculates a standard deviation of sub-edges on all four sides of a video block. (Step 710). In other words, the video analyzer 118 analyzes each block of video in a frame to determine a difference in luminance along each edge in a block of video. In one embodiment, for example, the video blocks may be sixteen pixels by sixteen pixels. However, the blocks may be of any size. If the standard deviation of the sub-edges of a block is greater than a predetermined threshold, the block of video may be perceived as blocky by a viewer.

The video analyzer 118 then calculates a mean of differences for each sub-edge. (Step 720). In other words, for each video block in the frame the video analyzer 118 calculates the average of the changes (deltas) in luminance of each of the 4 edges in the video block. Here the comparison happens relative to the next data to the block.

If the average standard deviation is below a predetermined threshold and the mean of differences for each sub-edge is below a predetermined threshold, the video analyzer 118 determines that the video content is not perceived as blocky and returns to Step 710 to analyze subsequent frames. (Step 730). However, if the average standard deviation is above the predetermined threshold and the mean of differences for each sub-edge is above the predetermined threshold, the video analyzer 118 determines that the video content may be perceived as blocky and continues to analyze the video frame(s) as discussed in further detail below. In one embodiment, for example, the predetermined thresholds may be 1.0 for Standard deviation and 3 and 35 the lower and upper thresholds for delta, however, the predetermined threshold can vary depending upon a desired sensitivity. As discussed in further detail below, the video analyzer 118 further processes the video frame(s) to eliminate false blockiness detections. In other words, some video frames may include valid data which may trigger a blockiness detection in Step 730, such as video frames with repeating patterns such as bars, windows in large buildings, clothing patterns, or the like. The subsequent processing attempts to minimize false detections of blockiness to prevent content receiver responses to valid video data.

When both the standard deviation calculation from Step 710 and the mean delta calculation from Step 620 indicate possible blockiness in the video frame, the video analyzer 118 then checks for edge distinctness. (Step 740). The video analyzer 118 checks for edge distinctness by performing a discrete cosine transform (DCT) on the blocks of pixels in the video frame. The DCT expresses the entire block of pixels, rather than just the edges, in terms of a sum of cosine functions oscillating at different frequencies. In other words, the result of the DCT of the video block can be used to determine if the edge of the block is distinct from the content in the center of the block. When the content of the entire block is consistent with the edges of the block, the block is less perceptible and may be assumed to be part of the video frame data rather than a compression artifact. In other words, where there are many transitions within a video block, the transitions on the edges are more likely to be part of the actual video data rather than a compression artifact. When there is no edge distinctness the video analyzer returns to Step 710 to analyze the next frame.

When there is edge distinctness, the video analyzer 118 then calculates weights for the remaining detected edges and eliminates edges under a predetermined weight. (Step 750). The weight assigned to each edge by the video analyzer 118 is based upon a luminance and chrominance of the pixels in the edge. The luminance of the pixel corresponds to a brightness of a pixel. The chrominance of the pixels corresponds to the color of the pixel. In one embodiment, for example, the video analyzer may assign higher weight to edges whose luminance (Y) is greater than 64 (i.e., Y>64) and whose chrominance (U) is greater than 192 (i.e., U>192). The luminance and chrominance scale is from 0-255 where 0 indicates dark and 255 indicates bright. Blockiness is most perceptible when it occurs when the pixel intensity is between 64 and 192; when the scene is dark (<64) or too bright (>192) the blockiness is less perceptible hence provided lower weights. The weighting is assigned in this fashion as blockiness in average color/brightness situations (e.g., grays) is more apparent than blockiness in extreme color/brightness situations (e.g, white and black). Because the luminance and the chrominance of the edges are taken into account, user perceptibility of the edges is accounted for. In other words, the video analyzer 118, based upon the weight assigned to edges, can eliminate edges that users will not substantially perceive from the compression artifact analysis.

The video analyzer 118 then removes data blocks from consideration with edges likely part of video data by detecting patterns between multiple video blocks. (Step 760). A video block having distinct edges (i.e., edges distinct from the center of the block) is likely to be part of video data, rather than being part of a compression artifact, when edges between multiple video blocks align in either a vertical or horizontal direction, both in the vertical and horizontal directions, or are skewed in number towards horizontally or vertically aligned edges. In other words, when a length of a detected edge between multiple video blocks exceeds a length of the video block or the number of horizontal edges or vertical edges of any length are skewed in number, the edge can be assumed to be part of the video data rather than a compression artifact. As discussed above, the video blocks may be sixteen pixels by sixteen pixels. Accordingly, in this embodiment, an edge equal to or greater than seventeen pixels in length can be assumed to be part of the video data. This step can eliminate patterns such as netting, bars, columns, windows (e.g., a sky scraper), patterns in fabric (e.g., plaid, stripes, etc.), or the like which may falsely trigger a blockiness detection by the video analyzer 118. The false edges, and their weights calculated in Step 760, are thus removed from consideration by the video analyzer 118.

The video analyzer 118, then determines if blockiness due to compression is present in the video frame(s). (Step 770). Blockiness in blocks with edges remaining after Steps 750-760, are blocks having edge distinctness and which could not be eliminated as false edges (i.e., the blocks could not be eliminated as being due to actual video data). Accordingly, the video analyzer 118 finds the total macroblocks that were detected as blocky in a frame; if, for example, 2% of the macroblocks are detected as blocky the frame is perceived to be blocky else the frame is treated as non-blocky frame.

When false blockiness is detected, the video analyzer 118 returns to step 710 to analyze subsequent video frames. When the video analyzer 118 detects blockiness due to compression, the video analyzer 118 triggers one or more content receiver responses. (Step 780). The content receiver response, for example, may be to utilize the communication system 112 to instruct the content source 120 to start encoding video content currently being viewed, saved, or retransmitted at a higher bit rate or to restart transmitting the video content at the higher bit rate. However, the content system response can vary depending upon the needs of the system. In one embodiment, for example, the content system response may be to transmit health of a channel data with respect to compression to a monitoring system via the communication system 112. In other embodiments, for example, the video analyzer 118 may send a request to the content source 120 through the communication system 112 to retransmit the portions of the video content where the compression caused blockiness. In yet other embodiments, for example, the content system response may be to schedule a new recording of the video content so that a good quality copy of the video content is available to be watched later by a user of the content receiver 110. In this embodiment, the video analyzer 118 may present a notification to the user that a recording of the program has been scheduled so that the user can decide whether to continue watching the program experiencing blockiness due to compression. In another embodiment, for example, the video analyzer 118 can ask the source to send lower resolution content to avoid the blockiness in video. Any combination of the content system responses may be used by the content receiver 110 in response to the video analyzer detecting low quality video content. After performing the one or more content receiver responses, the video analyzer 118 may return the Step 710 to continue analyzing subsequent video frames.

The video analyzer 118 may analyze video content for any combination of artifact insertion (previous data, default data, or both) and compression caused blockiness. Accordingly, the video analyzer 118 of the content receiver 110 can effectively, and without significant false detection, determine when artifact insertions and/or when compression may be affecting a user's viewing experience. The video analyzer 118 can therefore trigger the one or more content receiver responses only when a user's viewing experience is truly diminished.

The term "exemplary" is used herein to represent one example, instance or illustration that may have any number of alternates. Any implementation described herein as "exemplary" should not necessarily be construed as preferred or advantageous over other implementations.

Although several exemplary embodiments have been presented in the foregoing description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. A content receiver, comprising:
   a communication system configured to receive video content comprising a plurality of video frames from a content source; and
   a video analyzer communicatively coupled to the communication system the video analyzer comprising a processor and memory, the video analyzer configured to:
   determining a plurality of video blocks in the one or more of the plurality of video frames;
   calculating, for each of the determined plurality of blocks, a standard deviation of each sub-edge of the respective block of the determined plurality of blocks;
   calculating, for each of the determined plurality of blocks, a mean of differences for each sub-edge;
   determining, for each of the determined plurality of blocks, that one or more blocks of video content may be perceived as blocky when the standard deviation of one or more sub-edge of the respective block of the determined plurality of blocks is above a predetermined threshold and when the mean of differences for one or more sub-edge is above a predetermined threshold;

determine, when one or more blocks of video content may be perceived as blocky, when the one or more blocks of video content which may be perceived as blocky have edge distinctness when edges of the one or more blocks of video content which may be perceived as blocky are distinct from the centers of the one or more blocks of video content which may be perceived as blocky;

determining, for each video block determined to have edge distinction, a weight for each edge of the respective video block;

determining, for each video block determined to have edge a weight over a predestined threshold, that the respective video block is blocky when there is no pattern between the respective video block and at least one other adjacent video block;

determine that compression of the video content is causing blockiness in the one or more blocks of video content by determining when a total number of microblocks in the one or more of the plurality of video frames determined to be blocky, while excluding the respective adjacent video blocks having the pattern there-between, exceeds a predetermined threshold; and trigger at least one content receiver response when the compression of the video content is causing blockiness in the one or more blocks of video which have edge distinctness.

2. The content receiver of claim 1, wherein the weight is based upon a luminance and a chrominance for each edge of the respective video blocks.

3. The content receiver of claim 1, wherein the pattern is at least one edge aligning between the respective video block and at least one other adjacent video block.

4. The content receiver of claim 1, wherein the pattern includes blocks having more edges in a horizontal direction than a vertical direction.

5. The content receiver of claim 1, wherein the pattern includes blocks having more edges in a vertical direction than a horizontal direction.

6. A method for analyzing one or more video frames of video content, comprising:

receiving, by a video analyzer of a content receiver, the one or more video frames from a content source;

determining a plurality of video blocks in the one or more of the plurality of video frames:

calculating, for each of the determined plurality of blocks, a standard deviation of each sub-edge of the respective block of the determined plurality of blocks; and calculating, for each of the determined plurality of blocks, a mean of differences for each sub-edge;

determining, for each of the determined plurality of blocks, that a respective video block may be perceived as blocky when the standard deviation of each sub-edge of the respective block of the determined plurality of blocks is above a predetermined threshold and when the mean of differences for each sub-edge is above a predetermined threshold;

determining, by the video analyzer when one or more blocks of video content may be perceived as blocky, when the one or more blocks of video content which may be perceived as blocky have edge distinctness where edges of the one or more blocks of video content which may be perceived as blocky are distinct from the centers of the one or more blocks of video content which may be perceived as blocky; and determining, for each video block determined to have edge distinction, a weight for each edge of the respective video block, wherein the weight is based upon a luminance and a chrominance for each edge of the respective video blocks;

determining, for each video block determined to have edge a weight over a predestined threshold, that a respective video block is blocky when there is no pattern between a respective video block and at least one other adjacent video block;

determining that compression of the video content by the content source is causing the one or more video frames to be blocky determining when a total number of microblocks in the one or more of the plurality of video frames determined to be blocky, while excluding the respective adjacent video blocks having the pattern there-between, exceeds a predetermined threshold; and triggering, by the video analyzer of the content receiver, a content receiver response when compression of the video content by the content source is causing the one or more blocks of video which have edge distinctness to be blocky.

7. The method of claim 6, wherein the pattern is at least one edge aligning between the respective video block and at least one other adjacent video block.

* * * * *